(12) United States Patent
Okuno

(10) Patent No.: US 11,303,767 B2
(45) Date of Patent: Apr. 12, 2022

(54) IMAGE FORMING APPARATUS PERFORMING NETWORK AND NON-NETWORK CONNECTIONS

(71) Applicant: BROTHER KOGYO KABUSHIKI KAISHA, Nagoya (JP)

(72) Inventor: Tetsuya Okuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/034,112

(22) Filed: Sep. 28, 2020

(65) Prior Publication Data

US 2021/0099588 A1   Apr. 1, 2021

(30) Foreign Application Priority Data

Sep. 30, 2019 (JP) .............................. JP2019-178702

(51) Int. Cl.
| | |
|---|---|
| H04N 1/00 | (2006.01) |
| H04N 1/44 | (2006.01) |
| H04W 4/50 | (2018.01) |
| H04W 12/30 | (2021.01) |
| H04W 12/033 | (2021.01) |
| H04W 80/12 | (2009.01) |

(52) U.S. Cl.
CPC ....... *H04N 1/00411* (2013.01); *H04N 1/4413* (2013.01); *H04W 4/50* (2018.02); *H04W 12/033* (2021.01); *H04W 12/30* (2021.01); *H04W 80/12* (2013.01)

(58) Field of Classification Search
None
See application file for complete search history.

(56) References Cited

U.S. PATENT DOCUMENTS

2005/0005042 A1* 1/2005 Fukunaga ............. G06F 9/4413
                                                         710/62
2017/0094091 A1* 3/2017 Urakawa ................. H04L 51/24

FOREIGN PATENT DOCUMENTS

| JP | 2005-217657 A1 | 8/2005 |
| JP | 2012-140009 A | 7/2012 |
| JP | 2014-035723 A | 2/2014 |

* cited by examiner

*Primary Examiner* — Andrew H Lam
(74) *Attorney, Agent, or Firm* — Scully, Scott, Murphy & Presser, P.C.

(57) ABSTRACT

An image forming apparatus includes a user interface, a notification device, and a controller including a network driver performing communication via a network, a non-network driver performing communication with a terminal device connected to the image forming apparatus in a wired manner, without via the network, and a processor configuring a web server generating web screen data. The processor performs: determining whether a request of the web screen data is transmitted via the network driver or the non-network driver; when the request is transmitted via the network driver, notification processing, confirmation processing, and limitedly transmitting the web screen data to the terminal device; and when the request is transmitted via the non-network driver, unlimitedly transmitting the web screen data to the terminal device, without the notification processing and the confirmation processing.

7 Claims, 8 Drawing Sheets

IMAGE FORMING APPARATUS PERFORMING NETWORK AND NON-NETWORK CONNECTIONS

CROSS-REFERENCE TO RELATED APPLICATIONS

This application claims priority from Japanese patent application No. 2019-178702 filed on Sep. 30, 2019, the entire subject-matter of which is incorporated herein by reference.

TECHNICAL FIELD

The present disclosure relates to an image forming apparatus configured to perform network connection and non-network connection with a terminal device.

BACKGROUND

There has been proposed a remote panel technology in an image forming apparatus such as an MFP (abbreviation of Multifunction Peripheral), a printer and the like. The remote panel is technology of displaying, on a display of a terminal device connected to an image forming apparatus via a network such as a LAN (abbreviation of Local Area Network), web screen data corresponding to an operation screen transmitted in an HTTP (abbreviation of Hypertext Transfer Protocol) format from a web server in the image forming apparatus, receiving an operation on the image forming apparatus by the operation screen, transmitting information about the operation from the terminal device to the image forming apparatus, executing processing based on the information about the operation in the image forming apparatus, and transmitting information about an update screen associated with the processing to the terminal device. By using the remote panel technology, it is possible to operate an operation panel of the image forming apparatus from the terminal device.

There has been disclosed a related-art image forming system including an MFP and a mobile terminal (e.g., portable-type mobile terminal). The MFP is wirelessly connected to the mobile terminal via a wireless access point of a LAN. The mobile terminal that receives a predetermined operation from a user receives operation screen data from the MFP and displays the same on a touch panel thereof. When a user operation on the touch panel is received, the mobile terminal transmits information about the operation (for example, coordinates of an input, and the like) to the MFP. The MFP determines what a request received from the mobile terminal is, based on the information about the operation received from the mobile terminal, and executes processing based on the operation.

SUMMARY

One illustrative aspect of the present disclosure provides an image forming apparatus comprising: a recording device configured to form an image on a recording medium; a user interface configured to receive a user input; a notification device; and a controller, wherein the controller comprises: a network driver performing communication with a terminal device via a network; a non-network driver performing communication with a terminal device connected to the image forming apparatus in a wired manner, without via the network; and a processor configuring a web server, the web server being configured to generate web screen data relating to formation of an image in the recording device, the processor being configured to receive a transmission request of the web screen data of an HTTP format from the terminal device via the network driver or the non-network driver, and wherein the processor is configured to perform: (a) determining whether the transmission request is transmitted via the network driver or the non-network driver; (b) in a case it is determined that the transmission request is transmitted via the network driver, (b1) controlling the notification device to issue a notification; (b2) after the controlling of the notification device, confirming whether the user interface receives an approval input indicating that the transmission request is approved; and (b3) after it is confirmed that the user interface receives the approval input, limitedly transmitting the web screen data to the terminal device; and (c) in a case it is determined that the transmission request is transmitted via the non-network driver, unlimitedly transmitting the web screen data to the terminal device, without performing the controlling of the notification device and the confirming.

For the transmission request from the terminal device connected to the network, the web screen data is transmitted to the terminal device after the user interface receives the approval input via the notification processing and the confirmation processing, and for the transmission request from the terminal device connected to the non-network, the web screen data is transmitted without executing the notification processing and the confirmation processing. Therefore, while ensuring the sufficient security for the terminal device connected to the network, a user's operation burden can be reduced for the terminal device connected to the non-network.

BRIEF DESCRIPTION OF DRAWINGS

Illustrative embodiments of the disclosure will be described in detail based on the following figures, wherein.

DETAILED DESCRIPTION

In the above-described remote panel technology, when the terminal device connected to the network requests the image forming apparatus to transmit the web screen data of the HTTP format, an approval button is displayed on a main body screen of the image forming apparatus. When the approval button is pressed, the web screen data is transmitted to the terminal device. In this way, an unauthorized access from the terminal device connected to the network is prevented, so that sufficient security can be ensured. In the meantime, there is a terminal device capable of not only network connection but also non-network connection such as USB (abbreviation of Universal Serial Bus) connection via a cable with the image forming apparatus. When "HTTP over USB" or "Ethernet over USB" technology of implementing http data transfer via USB connection is used, the web screen data of the HTTP format can be transmitted to the terminal device connected to the USB. The non-network connection is wired connection of a relatively short distance, in most cases, so that the unauthorized access little occurs. If the approval button is displayed on the main body screen of the image forming apparatus and the user is prompted to press the approval button even when the terminal device connected to the non-network requests transmission of the web screen data, it imposes an excessive operation burden on the user, so that it is not favorable in terms of usability.

Therefore, illustrative aspects of the present disclosure provide an image forming apparatus which can reduce a user's operation burden for a terminal device connected to a non-network while ensuring sufficient security for a terminal device connected to a network in a case there is a transmission request of web screen data from a terminal device.

(Overall Configuration of Apparatus)

Hereinbelow, a multifunction peripheral that is an image forming apparatus in accordance with a preferable illustrative embodiment of the present disclosure will be described with reference to the drawings.

Figure 1:
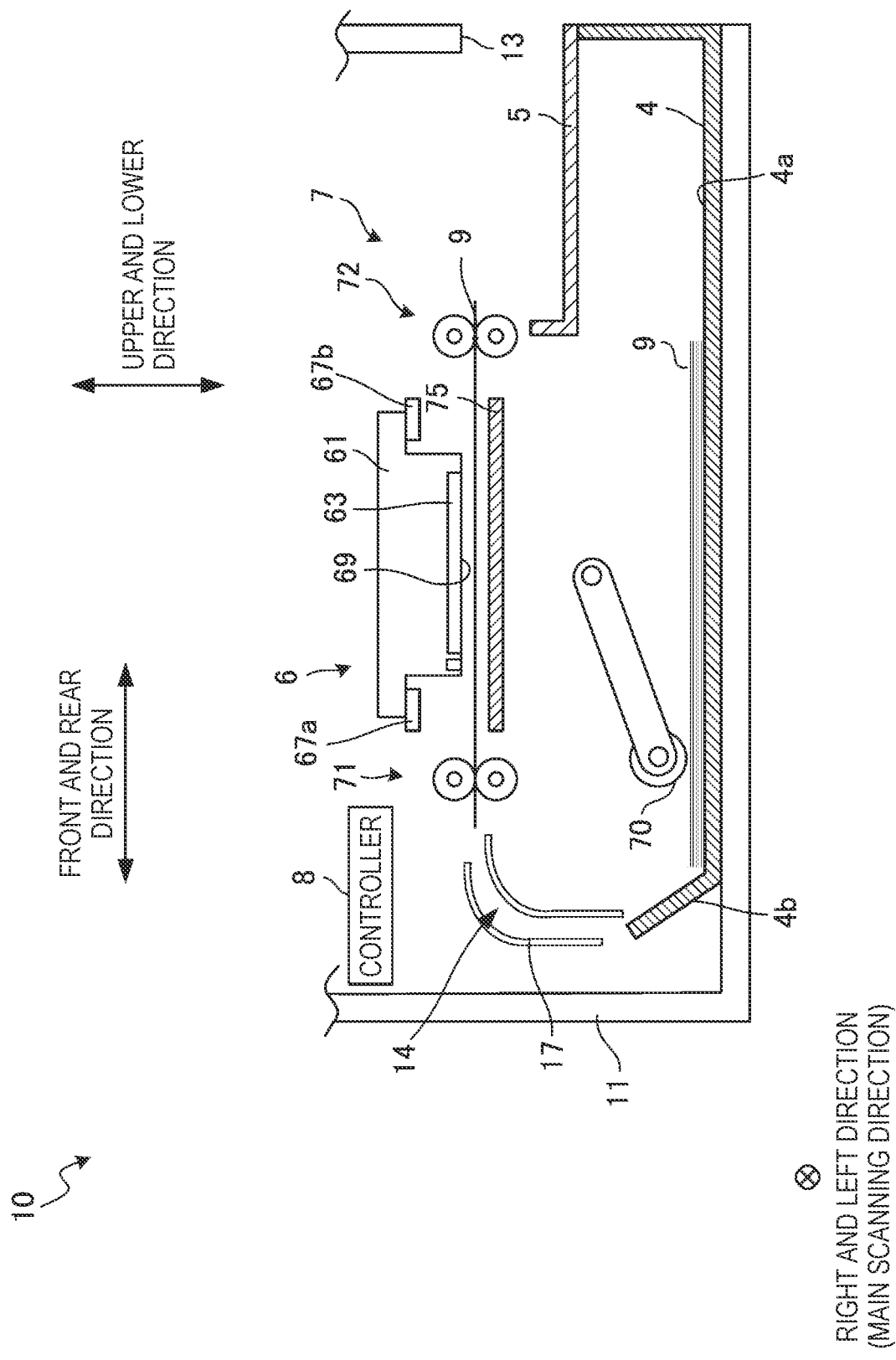
FIG. 1 is a schematic side view depicting an internal structure of a multifunction peripheral as an image forming apparatus in accordance with one illustrative embodiment of the present disclosure.

FIG. 1 depicts an internal configuration of a multifunction peripheral 10. In descriptions below, an upper and lower direction is defined on the basis of a state (a state in FIG. 1) in which the multifunction peripheral 10 is usably equipped, a front and rear direction is defined in a state where a side of a housing 11 on which an opening 13 is provided is set as a front side (front face), and a right and left direction is defined when the multifunction peripheral 10 is seen from the front side (front face).

As shown in FIG. 1, the multifunction peripheral 10 includes a sheet feeding tray 4, a sheet discharge tray 5, a print module 6 (one example of a recording unit), a conveyor module 7, and a controller 8. The sheet feeding tray 4, the print module 6, the conveyor module 7, and the controller 8 are accommodated in the housing 11 of the multifunction peripheral 10. The controller 8 is configured to control the multifunction peripheral 10 as a whole. In the housing 11, the sheet feeding tray 4 is disposed below the print module 6. In the meantime, although not shown in FIG. 1, the multifunction peripheral 10 further includes a reading module 18 (refer to FIG. 2) disposed on the housing 11.

The sheet feeding tray 4 can accommodate a plurality of sheets 9 while supporting the same in a stacked state. The sheet feeding tray 4 can be inserted and pulled out in the front and rear direction through the opening 13 formed on the front face of the housing 11. In the meantime, the sheet discharge tray 5 is disposed above the front side of the sheet feeding tray 4, and is configured to move together with the sheet feeding tray 4. The sheet feeding tray 4 has a support surface 4a on which the sheets 9 are supported. The support surface 4a is a surface perpendicular to the upper and lower direction. When the sheet feeding tray 4 is located in the housing 11, the support surface 4a is exposed to an internal space of the housing 11. A rear end portion of the sheet feeding tray 4 is provided with an inclined plate 4b.

The print module 6 includes a carriage 61, and a recording head 63. The carriage 61 is supported by two guide rails 67a and 67b. The two guide rails 67a and 67b are disposed with being spaced from each other in the front and rear direction, and extend in the right and left direction, respectively. The carriage 61 is disposed to extend over the two guide rails 67a and 67b. The carriage 61 is configured to reciprocally move in the right and left direction, which is a main scanning direction, along the two guide rails 67a and 67b by a carriage drive motor 21 (refer to FIG. 2). The recording head 63 is mounted on the carriage 61. The recording head 63 is configured to discharge ink supplied from an ink cartridge (not shown) from a plurality of nozzles (not shown) provided in a nozzle surface 69 of a lower surface.

The conveyor module 7 is configured to convey the sheet 9 in the print module 6, and includes a feeder roller 70, a pair of conveying rollers 71, a pair of discharge rollers 72, a platen 75, and a guide member 17. The feeder roller 70 is configured to rotate by a drive force applied from a feeder motor 22 (refer to FIG. 2), thereby delivering rearward the uppermost sheet 9 of the sheets supported in the sheet feeding tray 4.

The pair of conveying rollers 71 and the pair of discharge rollers 72 are disposed with sandwiching the print module 6 therebetween in the front and rear direction, the pair of conveying rollers 71 is disposed behind the print module 6, and the pair of discharge rollers 72 is disposed ahead of the print module 6. The platen 75 is disposed below the print module 6 so as to face the nozzle surface 69 of the print module 6. The pair of conveying rollers 71 and the pair of discharge rollers 72 are configured to drive by a drive force applied from a conveyor motor 23 (refer to FIG. 2).

The guide member 17 is configured to define a conveying path 14 through which the sheet 9 delivered from the sheet feeding tray 4 is sent to an area facing the nozzle surface 69 of the recording head 63. The guide member 17 extends from a vicinity of a rear end of the sheet feeding tray 4 to a vicinity of the pair of conveying rollers 71.

The sheet 9 delivered rearward from the sheet feeding tray 4 by the feeder roller 70 is directed obliquely upward by the inclined plate 4b provided at the rear end portion of the sheet feeding tray 4, passes through the conveying path 14 defined by the guide member 17, and reaches a position in which it is sandwiched by the pair of conveying rollers 71. The sheet 9 sandwiched by the pair of conveying rollers 71 is conveyed to an area facing the nozzle surface 69 of the recording head 63 by the pair of conveying rollers 71. The ink is discharged from the nozzles (not shown) of the recording head 63 moving in the main scanning direction to the sheet 9 conveyed by the pair of conveying rollers 71 in a state where the sheet is supported by the platen 75, so that an image is recorded on the sheet. The recorded sheet 9 is conveyed forward by the pair of discharge rollers 72 and is then discharged onto the sheet discharge tray 5.

(Block Configuration)

Figure 2:
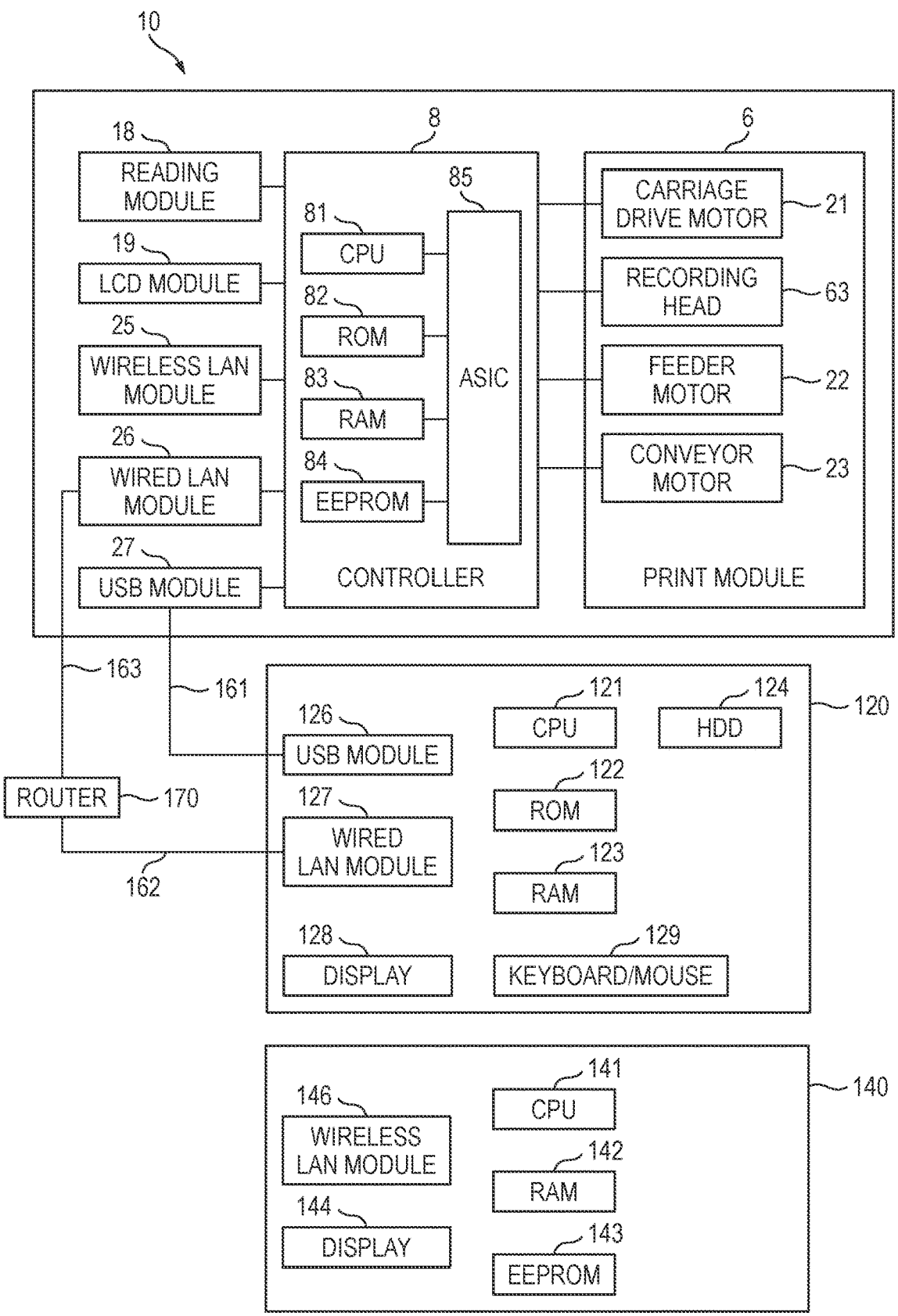
FIG. 2 is a block diagram depicting hardware configurations of the multifunction peripheral shown in FIG. 1 and a computer and a mobile terminal connected to the multifunction peripheral.

Subsequently, a block configuration of the multifunction peripheral 10 in accordance with the present illustrative embodiment is described with reference to FIG. 2. As shown in FIG. 2, the controller 8 of the multifunction peripheral 10 is electrically connected to the carriage drive motor 21, the recording head 63, the feeder motor 22 and the conveyor motor 23 of the multifunction peripheral 10. Also, the controller 8 is electrically connected to a reading module 18, an LCD (abbreviation of Liquid Crystal Display) module 19 (one example of a notification unit), a wireless LAN module 25, a wired LAN module 26 and a USB module 27.

The reading module 18 is a flatbed-type image reading device including a linear image sensor such as a CCD (abbreviation of Charge Coupled Device). The image sensor is long in the main scanning direction, and is configured to read a document put on a reading surface (not shown) with moving in a sub-scanning direction and to output image data. The LCD module 19 includes a display on which a variety of information about the multifunction peripheral 10 is displayed by characters and/or images. The display is one example of a notification unit. The display is configured as a touch panel, and when a user touches the display, position information of the touched position is output to the controller 8. The display is one example of a reception unit.

The wireless LAN module 25 is configured to perform network communication with another communication device (in the present illustrative embodiment, a mobile terminal 140), in conformity to wireless LAN communication standards such as IEEE 802.11ac. The wired LAN module 26 has a LAN port that is an insertion port of a LAN cable 163, and is configured to perform network communication with another communication device (in the present illustrative embodiment, a PC 120) connected via a router 170, in conformity to wired LAN communication standards such as Ethernet (registered trademark). The USB module 27 has a USB port that is an insertion port of a USB cable 161, and is configured to perform USB communication (non-network communication) with another communication device (in the present illustrative embodiment, the PC 120) to which the USB cable 161 is connected, in conformity to USB standards. Therefore, the multifunction peripheral 10 can perform data communication via any one of the modules 25, 26 and 27, in conformity to the communication standards.

As shown in FIG. 2, the controller 8 includes a CPU (abbreviation of Central Processing Unit) 81, a ROM (abbreviation of Read Only Memory) 82, a RAM (abbreviation of Random Access Memory) 83, an EEPROM (abbreviation of Electrically Erasable Programmable Read-Only Memory) 84, and an ASIC (abbreviation of Application Specific Integrated Circuit) 85, and is configured to control operations of each unit of the print module 6, each unit of the reading module 18, the LCD module 19, the wireless LAN module 25, the wired LAN module 26 and the USB module 27, in cooperation with the same.

The controller 8 is configured to execute an image recording operation of recording an image relating to image data input from the PC 120 or the mobile terminal 140 on the sheet 9, a copy operation of recording an image on the sheet 9, based on image data obtained in the reading module 18, a reading operation of storing image data obtained in the reading module 18 in a desired place, and the like. In the meantime, in the image recording operation, the controller 8 is configured to control the carriage drive motor 21 so as to reciprocally move the carriage 61 in the main scanning direction. Also, the controller 8 is configured to control the recording head 63 so as to discharge the ink from the nozzles (not shown) of the recording head 63, based on image data stored in the RAM 83. Also, the controller 8 is configured to control the feeder motor 22 and the conveyor motor 23 so that the sheet 9 accommodated in the sheet feeding tray 4 passes a position facing the recording head 63 and is then discharged to the sheet discharge tray 5.

In FIG. 2, the CPU 81 and the ASIC 85 are shown one by one. However, the controller 8 may include only one CPU 81 and the one CPU 81 may be configured to collectively execute necessary processing, or may include a plurality of CPUs 81, and the plurality of CPUs 81 may be configured to share and execute necessary processing. Also, the controller 8 may include only one ASIC 85 and the one ASIC 85 may be configured to collectively execute necessary processing, or may include a plurality of ASICs 85 and the plurality of ASICs 85 may be configured to share and execute necessary processing.

The PC 120 includes a CPU 121, a ROM 122, a RAM 123 and an HDD (abbreviation of Hard Disk Drive) 124. In the HDD 124, an OS (abbreviation of Operation System) for controlling operations of the PC 120, a multifunction peripheral managing program for controlling operations of the multifunction peripheral 10, and the like are installed. Also, the PC 120 includes a display 128, and an input device 129 such as a keyboard, a mouse and the like that the user operates. The CPU 121 can control operations of the multifunction peripheral 10 by executing the multifunction peripheral managing program. As described later, in the present illustrative embodiment, a web screen received from the multifunction peripheral 10 is displayed on the display 128.

The PC 120 further includes a USB module 126 and a wired LAN module 127. In the present illustrative embodiment, the USB module 126 is connected to the USB module 27 of the multifunction peripheral 10 via the USB cable 161. The wired LAN module 127 is connected to the router 170 via the LAN cable 162. The router 170 may be connected to the Internet, or not. Also, when the router 170 includes a wireless LAN module, the router 170 may be wirelessly connected to the wireless LAN module 25.

The mobile terminal 140 such as a smart phone, a tablet PC and the like includes a CPU 141, a RAM 142 and an EEPROM 143. In the EEPROM 143, an OS for controlling operations of the mobile terminal 140, a multifunction peripheral managing program for controlling operations of the multifunction peripheral 10, and the like are installed. Also, the mobile terminal 140 includes a touch panel display 144 that is an input/output device. A web screen received from the multifunction peripheral 10 is displayed on the display 144.

The mobile terminal 140 further includes a wireless LAN module 146. In the present illustrative embodiment, the wireless LAN module 146 is directly wirelessly connected to the wireless LAN module 25 of the multifunction peripheral 10 (ad hook mode). In the meantime, when the router 170 includes a wireless LAN module, the wireless LAN module 146 may be wirelessly connected to the multifunction peripheral 10 via the router 170 (infrastructure mode).

(Configuration of Software)

Figure 3:
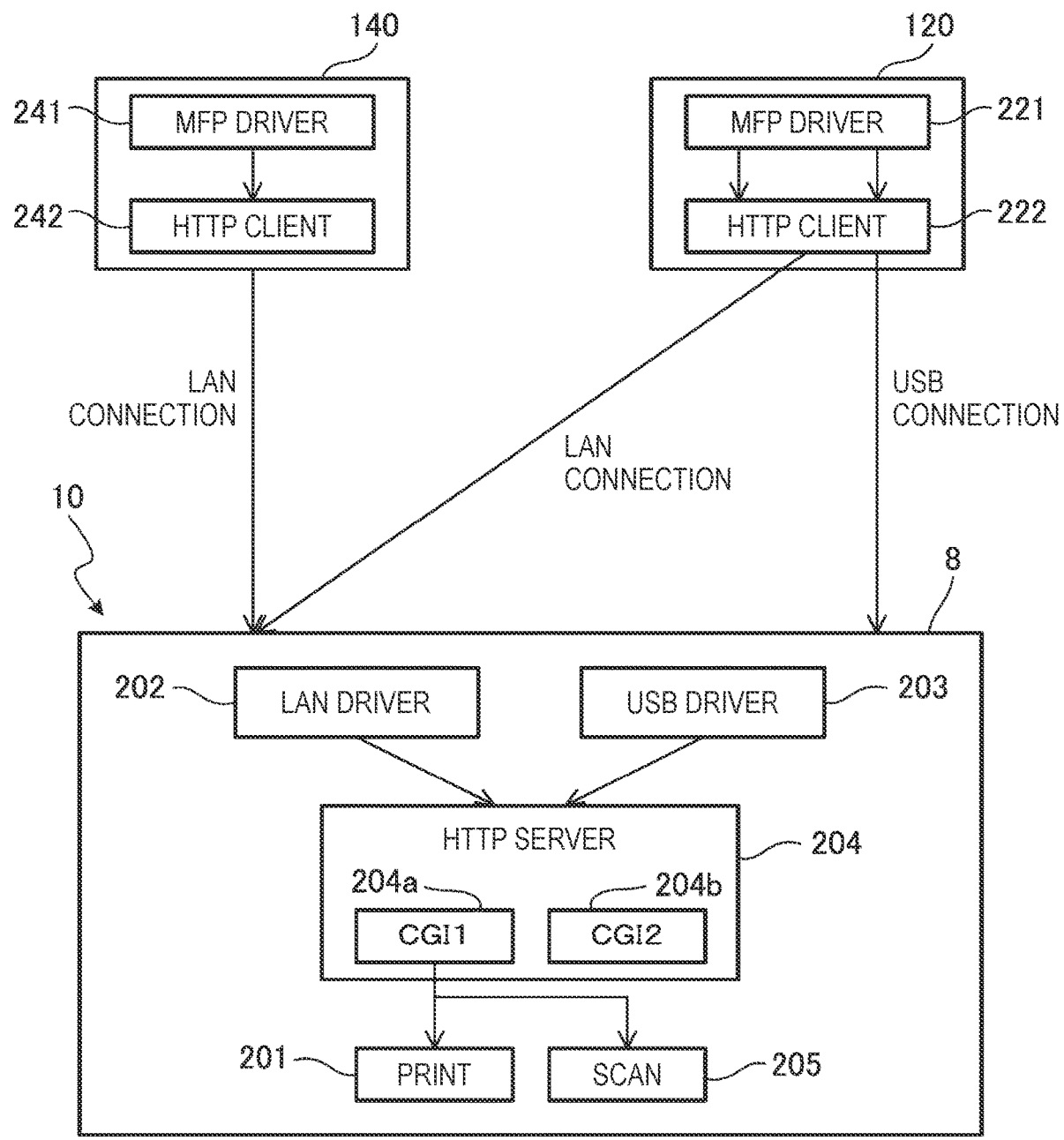
FIG. 3 is a block diagram depicting FIG. 2, as a software configuration relating to a connection request from the computer and the mobile terminal to the multifunction peripheral.

Subsequently, a configuration of software relating to a connection request from the PC 120 and the mobile terminal 140 to the multifunction peripheral 10 is described with reference to FIG. 3. In the present illustrative embodiment, the PC 120 includes an MFP driver 221 and an HTTP client 222. In the present illustrative embodiment, the mobile terminal 140 includes an MFP driver 241 and an HTTP client 242. The MFP driver 221 and the MFP driver 241 are configured to generate, based on user's input operations, a printing command (including print setting data such as the number of sheets to be printed, an image quality and the like, in addition to the image data), a reading command, a copy command (image recording in the print module 6, based on the image data generated in the reading module 18), a transmission (remote panel) command of web screen data embedded in the multifunction peripheral 10, and the like for the multifunction peripheral 10. The HTTP client 222 and the HTTP client 242 are web clients corresponding to encryption protocols such as SSL, and are configured to output the printing command and the transmission command of the web screen data generated by the MFP driver 221 and the MFP driver 241, as a connection request of the HTTP format to the multifunction peripheral 10 (including a printing request, a reading request, a copy request, and a transmission request of the web screen data).

When outputting the connection request via the USB module 126, the HTTP client 222 of the PC 120 outputs the connection request, as it is a plain text, without encrypting the connection request. That is, a URL (abbreviation of Uniform Resource Locator) of the connection request output from the USB module 126 is, for example, "http://localhost/print" in the case of the printing command, and is, for example, "http://localhost/index" in the case of the transmission command of the web screen data.

When outputting the connection request via the wired LAN module 127, the HTTP client 222 of the PC 120 encrypts and outputs the connection request or outputs the connection request, as it is a plain text. That is, a URL of the connection request output from the wired LAN module 127 is, for example, "https://example/print" (encryption) or "http://example/print" (plain text) in the case of the printing command, and is, for example, "https://example/index" or "http://example/index" in the case of the transmission command of the web screen data. In the meantime, this also applies to a case where the HTTP client 222 outputs the connection request via the wireless LAN module.

Also, the HTTP client 242 of the mobile terminal 140 encrypts and outputs the connection request output via the wireless LAN module 146 or outputs the connection request, as it is a plain text. That is, a URL of the connection request output from the wireless LAN module 146 is, for example, "https://example/print" or "http://example/print" in the case of the printing command, and is, for example, "https://example/index" or "http://example/index" in the case of the transmission command of the web screen data.

The controller 8 of the multifunction peripheral 10 includes a printer driver 201, a scan driver 205, a LAN driver 202, a USB driver 203 that is a non-network driver, and a web server 204 as a processing unit corresponding to encryption protocols such as SSL. The printer driver 201 is configured to drive the print module 6, based on a printing request received from the web server 204. The scan driver 205 is configured to drive the reading module 18, based on a reading request received from the web server 204. The LAN driver 202 is configured to perform communication with the PC 120 and the mobile terminal 140 via a network. The USB driver 203 is configured to perform communication with the PC 120 connected to the multifunction peripheral 10 through the USB cable 161, without via the network.

The connection request transmitted from the PC 120 is received by the USB driver 203 when it is transmitted via the USB cable 161, and is received by the LAN driver 202 when it is transmitted via the LAN cables 162 and 163. Also, the connection request transmitted from the mobile terminal 140 is received by the LAN driver 202. In the present illustrative embodiment, when the LAN driver 202 receives the connection request from the PC 120 or the mobile terminal 140, the LAN driver 202 sets a reception flag stored in the web server 204 and indicating that the LAN driver 202 receives the connection request to an on state. Therefore, even when the USB driver 203 receives the connection request from the PC 120, the reception flag is kept as it is off.

The web server 204 is configured to receive the connection request of the HTTP format from the PC 120 and the mobile terminal 140 via the LAN driver 202 or the USB driver 203, and to execute following processing. In the present illustrative embodiment, the web server 204 includes a first CGI (abbreviation of Common Gateway Interface) 204a and a second CGI 204b corresponding to URLs different from each other. The first CGI 204a is used so as to activate the printer driver 201 and/or the scan driver 205 from the web server 204. The second CGI 204b is used so as to cause the display 128 of the PC 120 and the display 144 of the mobile terminal 140 to display, as a remote panel, the web screen stored in the web server 204 (including a setting state of an operation parameter, an operation state of the multifunction peripheral 10, and an estimated remaining amount of ink, for example). In the present illustrative embodiment, the second CGI 204b is configured to cause the display 128 of the PC 120 and the display 144 of the mobile terminal 140 to display a screen including at least a part of contents to be displayed on the display of the LCD module 19.

In the present illustrative embodiment, the web server 204 assigns the connection request to the first CGI 204a when an end of a URL of the connection request is "/print", and assigns the connection request to the second CGI 204b when the end of the URL of the connection request is "/index".

The first CGI 204a rejects or receives the assigned connection request to activate the scan driver 205 and/or the printer driver 201, depending on whether the assigned connection request is transmitted via the USB or the LAN and whether the assigned connection request is encrypted if the assigned connection request is transmitted via the LAN. When the assigned connection request is transmitted via the LAN, the second CGI 204b causes the LCD module 19 to display a screen of asking the user whether to allow a remote panel display, and outputs data relating to the web screen stored in the web server 204 if an approval is input. In the present illustrative embodiment, the data relating to the web screen is output only when the connection request is encrypted and a verification of an ID and a password is successful. On the other hand, when the assigned connection request is transmitted via the USB, the second CGI 204b outputs the data relating to the web screen stored in the web server 204 without causing the LCD module 19 to display the screen of asking the user whether to allow a remote panel display. In this case, the data relating to the web screen is output on condition that the verification of an ID and a password is successful, without depending on whether the connection request is encrypted. The processing that is executed by the first CGI 204a and the second CGI 204b will be described in detail later.

(Operations of Multifunction Peripheral)

Figure 4A:
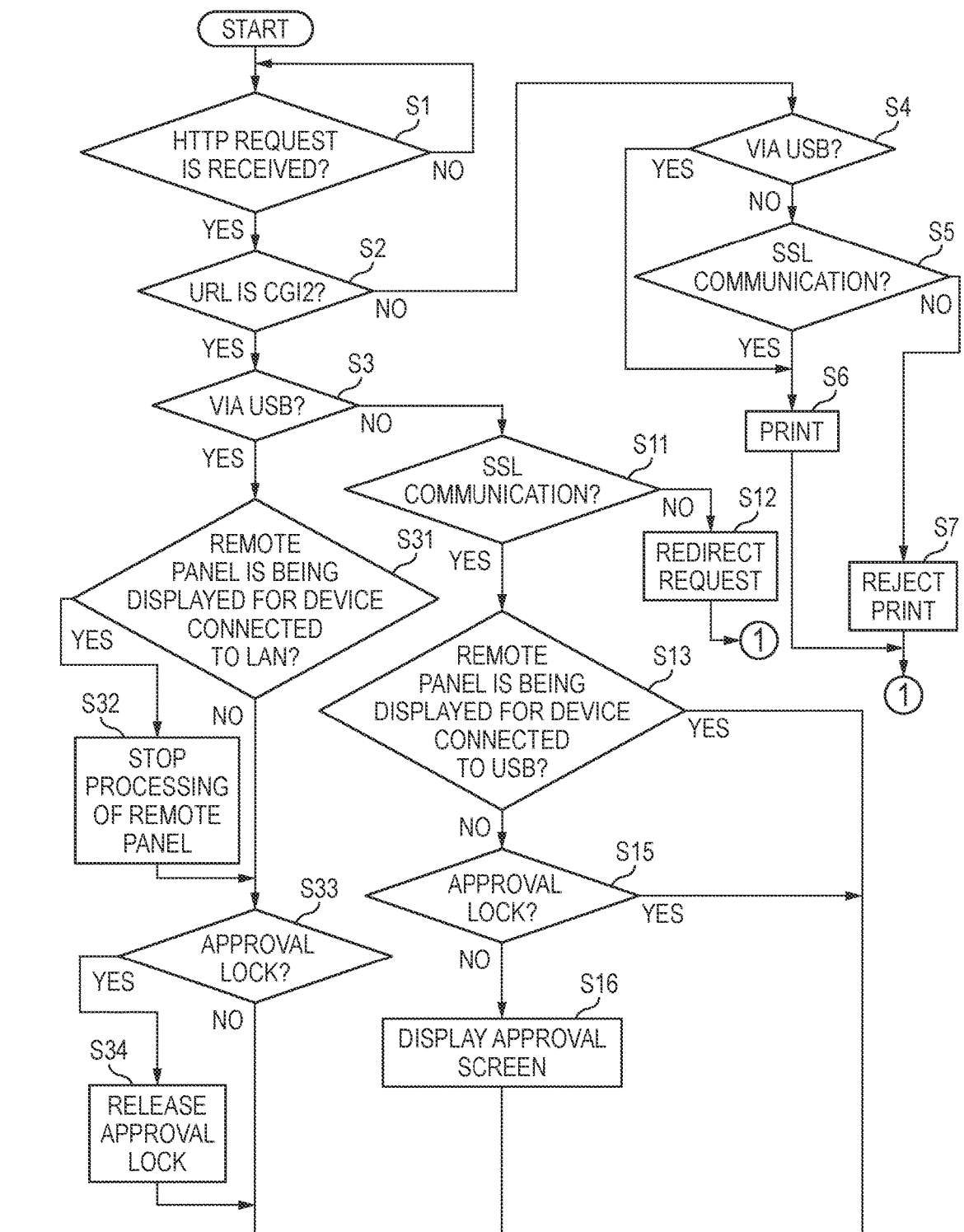
FIGS. 4A and 4B are flowcharts depicting operations of the multifunction peripheral shown in FIG. 1 when the connection request is received from the computer and the mobile terminal.
Figure 4B:
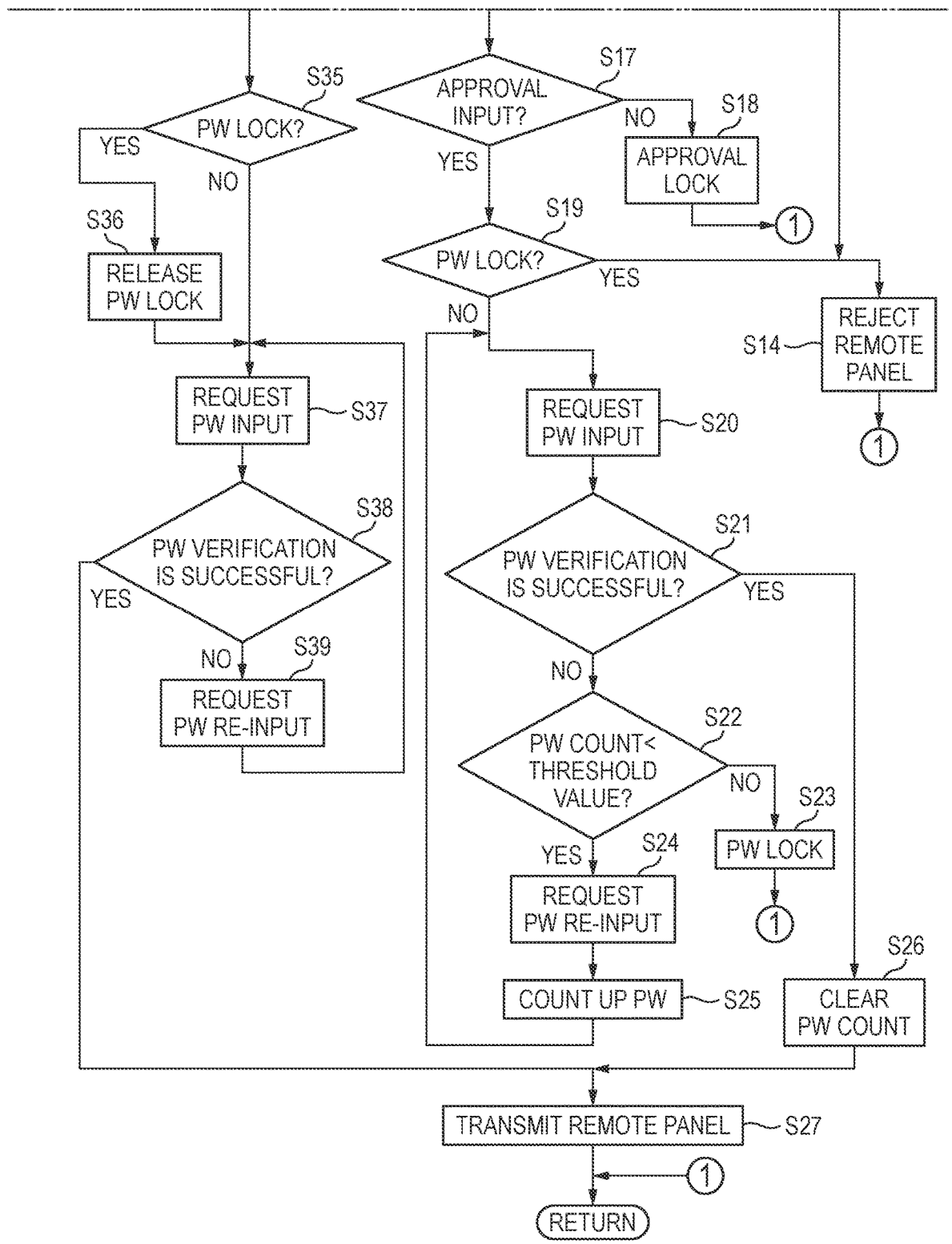

Subsequently, operations that are performed when the multifunction peripheral 10 receives a connection request from the PC 120 and the mobile terminal 140 are described with reference to FIGS. 4A and 4B. The operations that are described below are executed by the web server 204. Meanwhile, in the below, descriptions of the reading operation and the copy operation are omitted.

First, in 51, the web server 204 determines whether a connection request of the HTTP format is received. When it is determined that the connection request is received (51: YES), the web server 204 determines in S2 whether an end of a URL of the connection request is "/index". When it is determined that the end of the URL is "/index", the web server 204 assigns the connection request to the second CGI 204b (S2: YES), and proceeds to S3. When it is determined that the end of the URL is not "/index", i.e., is "/print", the web server 204 assigns the connection request to the first CGI 204a (S2: NO), and proceeds to S4.

In S4, the first CGI 204a determines whether the received connection request is transmitted via the USB or the LAN, based on whether the reception flag is on or off. That is, when the reception flag is on, it is determined that the connection request is transmitted via the LAN driver 202 via the LAN, and when the reception flag is off, it is determined that the connection request is transmitted via the USB driver 203 via the USB (transmission source determination processing). When it is determined that the connection request is transmitted via the LAN driver 202 (S4: NO), the first CGI 204a proceeds to S5. When it is determined that the connection request is transmitted via the USB driver 203 (S4: YES), the first CGI 204a proceeds to S6.

In this case, in S6, the first CGI 204a operates the printer driver 201 based on the connection request to drive the print module 6 without determining whether the connection request is encrypted (non-network receiving processing). Thereby, the ink is discharged from the recording head 63, so that an image is formed on the sheet 9.

In S5, the first CGI 204a determines whether the connection request is encrypted (encryption determination processing). When it is determined that the connection request is encrypted (S5: YES), the first CGI 204a proceeds to S6. On the other hand, when it is determined that the connection request is not encrypted (the connection request is a plain text) (S5: NO), the first CGI 204a proceeds to S7.

In this case, in S6, the first CGI 204a decrypts the encrypted connection request (decryption processing), and operates the printer driver 201 based on the decrypted connection request to drive the print module 6 (network reception processing). Thereby, the ink is discharged from the recording head 63, so that an image is formed on the sheet 9.

In the meantime, in S7, the first CGI 204a does not operate the printer driver 201 based on the connection request (print rejection processing). At this time, the first CGI 204a outputs data relating to a web screen including a message indicating that a printing cannot be performed. The output web screen is supplied to the PC 120 or the mobile terminal 140 through a reverse path to the path through which the connection request is received. Then, the web screen is displayed on the display 128 or 144 by the HTTP client 222 or the HTTP client 242.

In S3, the second CGI 204b determines whether the received connection request is transmitted via the USB or the LAN, based on whether the reception flag is on or off. That is, when the reception flag is on, it is determined that the connection request is transmitted via the LAN driver 202 via the LAN, and when the reception flag is off, it is determined that the connection request is transmitted via the USB driver 203 via the USB (transmission source determination processing). In this way, in the present illustrative embodiment, when the LAN driver 202 receives the connection request from the PC 120 or the mobile terminal 140, the reception flag becomes on, so that the web server 204 can easily execute the transmission source determination processing. When it is determined that the connection request is transmitted via the LAN driver 202 (S3: NO), the second CGI 204b proceeds to S11. When it is determined that the connection request is transmitted via the USB driver 203 (S4: YES), the second CGI 204b proceeds to S31.

In S11, the second CGI 204b determines whether the connection request is encrypted (encryption determination processing). Specifically, the second CGI 204b determines whether the connection request is encrypted, based on exchanging a certificate file relating to the SSL, checking whether a pre-procedure for encryption with the PC 120 or the mobile terminal 140 is performed, and the like. When it is determined that the connection request is not encrypted (the connection request is a plain text) (S11: NO), the second CGI 204b proceeds to S12. On the other hand, when it is determined that the connection request is encrypted (S11: YES), the second CGI 204b decrypts the encrypted connection request (decryption processing), and proceeds to S13.

In S12, the second CGI 204b transmits, toward the PC 120 or the mobile terminal 140, a redirect request for instructing to transmit the connection request to an address (for example, "https://example/index") corresponding to encrypted communication (redirect processing). Although not described in detail here, the PC 120 or the mobile terminal 140 having received the redirect request transmits the connection request to the address corresponding to encrypted communication.

In S13, the second CGI 204b determines whether the remote panel is in execution for another device different from the device having transmitted the connection request and USB-connected to the multifunction peripheral 10. This determination may be performed based on a USB flag (indicating whether a communication partner is USB-connected or LAN-connected when the remote panel is in execution) held by the second CGI 204b. When it is determined that the remote panel is in execution for another device connected to the USB (S13: YES), the second CGI 204b proceeds to S14. At this time, in S14, the second CGI 204b outputs data relating to a web screen including a message indicating that the remote panel cannot be displayed, without causing the display of the LCD module 19 to display an approval screen (which will be described later) based on the connection request (first rejection processing). The output web screen is supplied to the PC 120 or the mobile terminal 140 through a reverse path to the path through which the connection request is received. Then, the web screen is displayed on the display 128 or 144 by the HTTP client 222 or the HTTP client 242.

When it is determined that the remote panel is not in execution for another device connected to the USB (S13: NO), the second CGI 204b proceeds to S15. In S15, the second CGI 204b determines whether the multifunction peripheral 10 is in approval lock (which will be described later). This determination may be performed based on an approval lock flag (indicating whether approval lock is in progress) held by the second CGI 204b. When it is determined that the multifunction peripheral 10 is in approval lock (S15: YES), the second CGI 204b proceeds to S14. At this time, in S14, the second CGI 204b outputs data relating to a web screen including a message indicating that the remote panel cannot be displayed, without causing the display of the LCD module 19 to display an approval screen (which will be described later) based on the connection request (second rejection processing). The message is displayed on the display 128 or 144.

Figure 5A:
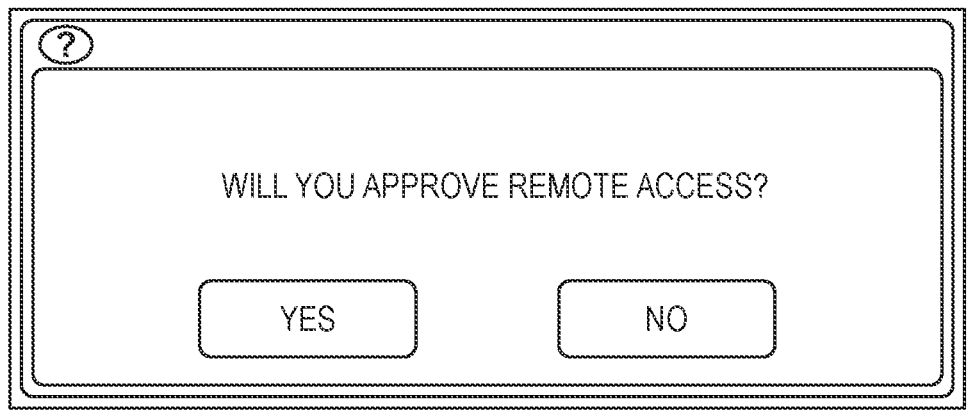
FIG. 5A depicts an approval screen that is displayed on an LCD module of the multifunction peripheral.

When it is determined that the multifunction peripheral 10 is not in approval lock (S15: NO), the second CGI 204b proceeds to S16. In S16, the second CGI 204b causes the display of the LCD module 19 to display an approval screen (notification processing). In the approval screen, as an example, as shown in FIG. 5A, a message "Will you approve remote access?" and "Yes" and "No" buttons are displayed. In S17, it is confirmed whether the user touches "Yes", i.e., whether the LCD module 19 receives an approval input for the remote panel display (confirmation processing). When the user touches "No", i.e., the LCD module 19 receives a rejection input to the remote panel display (S17: NO), the second CGI 204b sets the approval lock flag to an on state, so that the multifunction peripheral 10 shifts to an approval lock state (S18) (approval lock processing). At this time, the second CGI 204*b* outputs data relating to a web screen including a message indicating that the display request for the remote panel is canceled. The message is displayed on the display 128 or 144.

When the user touches "Yes", i.e., when the LCD module 19 receives an approval input for the remote panel display (S17: YES), the second CGI 204*b* proceeds to S19. In S19, the second CGI 204*b* determines whether the multifunction peripheral 10 is in password (which will also be referred to as PW) lock (which will be described later). This determination may be performed, based on a PW lock flag (indicating whether the PW lock is in progress) held by the second CGI 204*b*. When it is determined that the multifunction peripheral 10 is in PW lock (S19: YES), the second CGI 204*b* proceeds to S14. At this time, in S14, the second CGI 204*b* outputs data relating to a web screen including a message indicating that the remote panel cannot be displayed, without executing password verification processing (third rejection processing) (which will be described later). The message is displayed on the display 128 or 144.

Figure 5B:
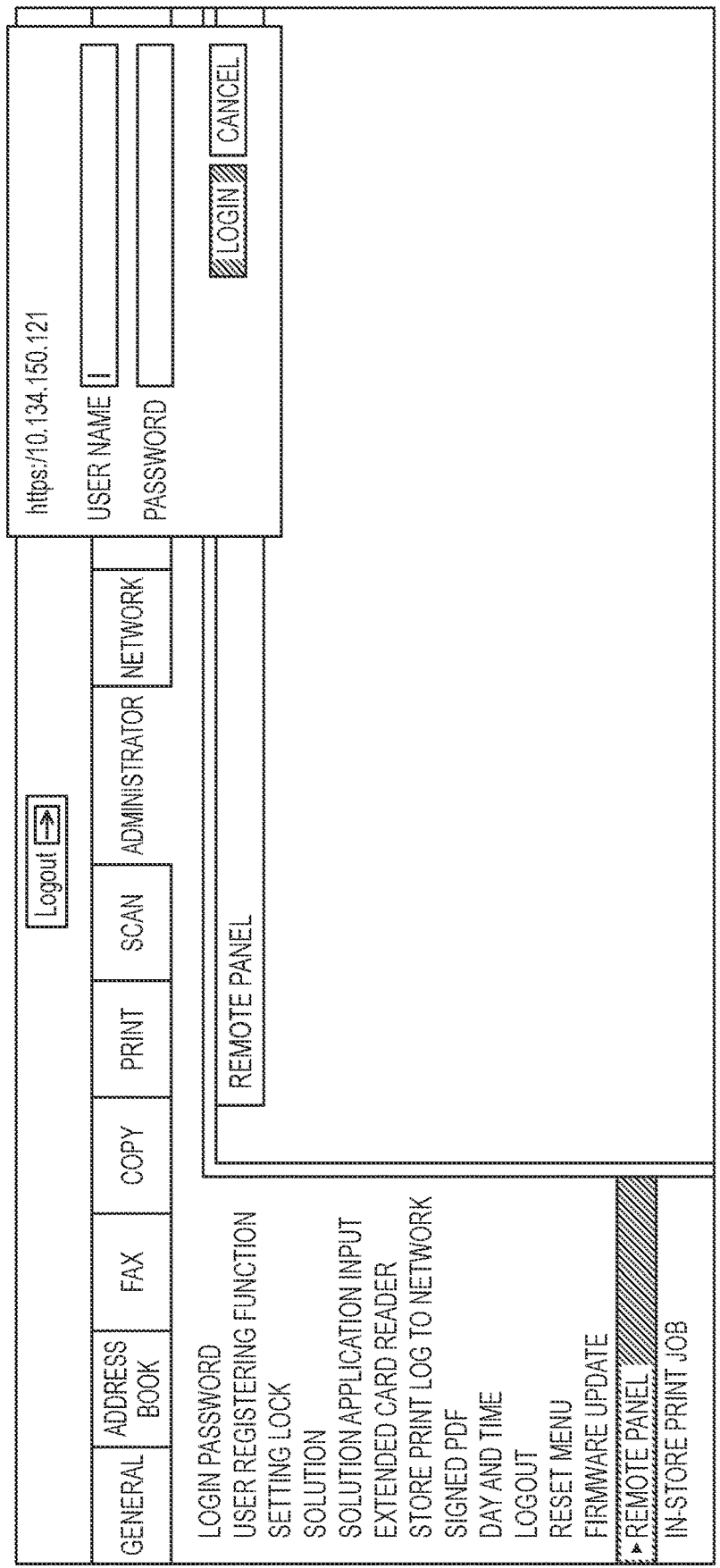
FIG. 5B depicts a password input screen that is displayed on a display of the computer.

When it is determined that the multifunction peripheral 10 is not in PW lock (S19: NO), the second CGI 204*b* proceeds to S20. In S20, the second CGI 204*b* causes the display 128 of the PC 120 or the display 144 of the mobile terminal 140 to display an input screen of an ID (identification information) and a PW, thereby prompting the user to input an ID and a PW. In the input screen, as an example, as shown in FIG. 5B, a text box for inputting a user name, a text box for inputting a password, and "login" and "cancel" buttons are displayed. When the "login" button is clicked, in S21, an ID and a PW input by the user are verified with a database stored in the EEPROM 84. When the verification fails (S21: NO), in S22, the second CGI 204*b* determines whether the number of failure times of the verification (initial value=0) is smaller than a predetermined threshold value.

When it is determined that the number of failure times of the verification is equal to or greater than the predetermined threshold value (S22: NO), the second CGI 204*b* sets the PW lock flag to an on state, so that the multifunction peripheral 10 shifts to a PW lock state (S23) (password lock processing). At this time, the second CGI 204*b* outputs data relating to a web screen including a message indicating that the ID and the password are not matched. The message is displayed on the display 128 or 144.

When it is determined that the number of failure times of the verification is smaller than the predetermined threshold value (S22: YES), in S24, the second CGI 204*b* again causes the display 128 of the PC 120 or the display 144 of the mobile terminal 140 to display the input screen of an ID and a PW, thereby prompting the user to input an ID and a PW (password verification processing). Also, in S25, the second CGI 204*b* counts up the number of failure times of the verification by one (+1), and returns to S21.

Figure 5C:
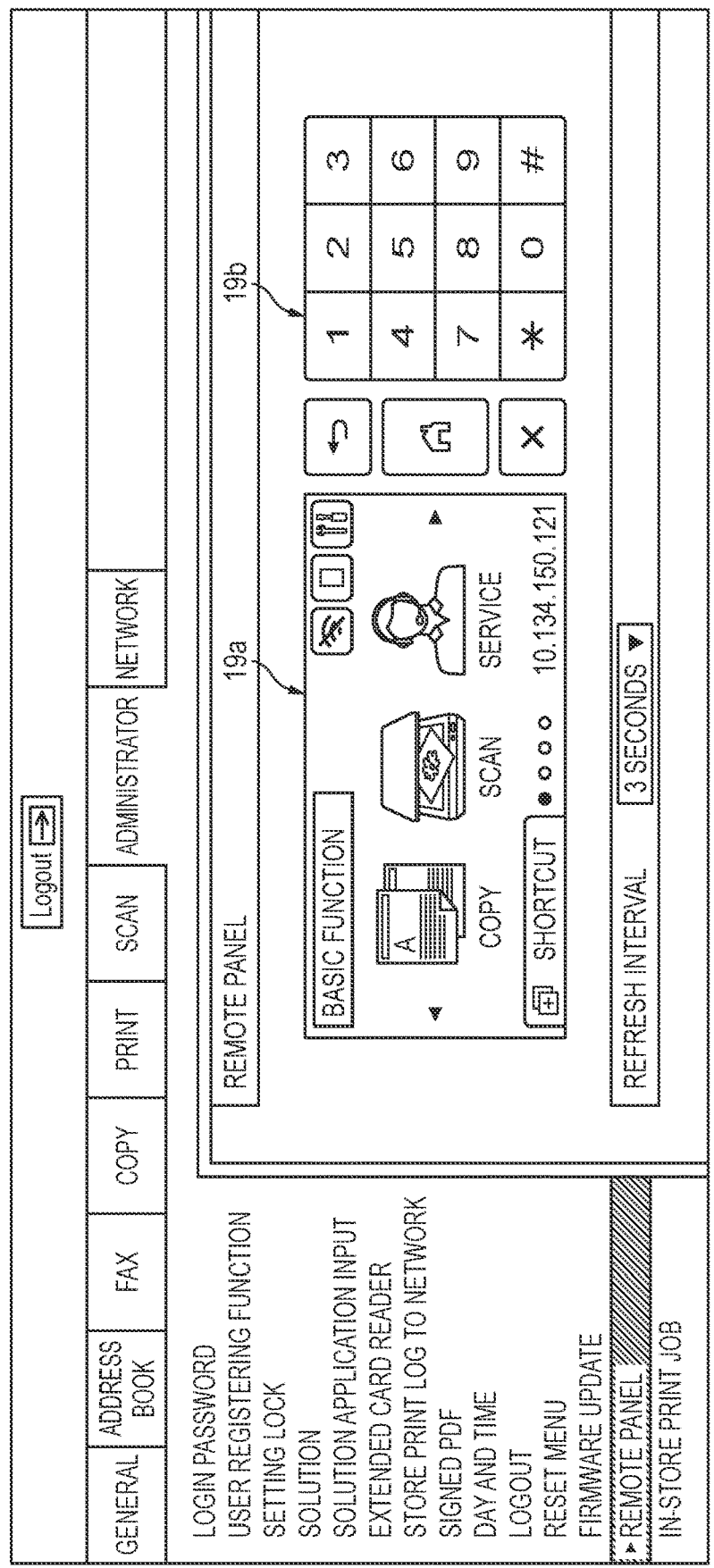
FIG. 5C is a pictorial view depicting a remote panel that is displayed on the display of the computer.

When the verification is successful (S21: YES), in S26, the second CGI 204*b* restores the count value of the counter of the number of failure times of the verification to the initial value (=0). Then, the second CGI 204*b* proceeds to S27, and transmits the web screen data generated by the second CGI 204*b* to the display 128 of the PC 120 or the display 144 of the mobile terminal 140 (limited transmission processing). In the present illustrative embodiment, the web screen that is displayed as the remote panel includes the same display area 19*a* that is the same as display contents on the display of the LCD module 19 at that time, and a ten-key display area 19*b*, as shown in FIG. 5C. In the web screen, for example, a remaining amount of ink, input columns of diverse setting parameters (a sheet size, an image quality and the like), and the like may be displayed. In the meantime, when the second CGI 204*b* proceeds from S26 to S27 in this way, in S27, the USB flag is off, i.e., indicates that the communication partner of the remote panel is connected to the LAN.

In S31, the second CGI 204*b* determines whether the remote panel is in execution for another device different from the device having transmitted the connection request and connected to the multifunction peripheral 10 via the LAN. This determination may be performed based on the USB flag. When it is determined that the remote panel is in execution for another device connected to the LAN (S31: YES), the second CGI 204*b* proceeds to S32. In S32, the remote panel display for another device connected to the LAN is stopped. At this time, the second CGI 204*b* outputs data relating to a web screen including a message indicating that the remote panel display is stopped to another device connected to the LAN. Then, the second CGI 204*b* proceeds to S33. On the other hand, when it is determined that the remote panel is not in execution (S31: NO), the second CGI 204*b* proceeds to S33 without via S32.

In S33, the second CGI 204*b* determines whether the multifunction peripheral 10 is in approval lock. This determination may be performed based on the approval lock flag. When it is determined that the multifunction peripheral 10 is in approval lock (S33: YES), the second CGI 204*b* proceeds to S34. In S34, the second CGI 204*b* releases the approval lock, i.e., sets the approval lock flag to an off state (approval lock release processing). Then, the second CGI 204*b* proceeds to S35. On the other hand, when it is determined that the multifunction peripheral 10 is not in approval lock (S33: NO), the second CGI 204*b* proceeds to S35 without via S34.

In S35, the second CGI 204*b* determines whether the multifunction peripheral 10 is in PW lock. This determination may be performed based on the PW lock flag. When it is determined that the multifunction peripheral 10 is in PW lock (S35: YES), the second CGI 204*b* proceeds to S36. In S36, the second CGI 204*b* releases the PW lock, i.e., sets the PW lock flag to an off state (password lock release processing). Then, the second CGI 204*b* proceeds to S37. On the other hand, when it is determined that the multifunction peripheral 10 is not in PW lock (S35: NO), the second CGI 204*b* proceeds to S37 without via S36.

In S37, the second CGI 204*b* causes the display 128 of the PC 120 to display an input screen of an ID and a PW, thereby prompting the user to input an ID and a PW. As an example, the input screen is the same as that shown in FIG. 5B. When the "login" button is clicked, in S38, the ID and PW input by the user are verified with the database stored in the EEPROM 84. When the verification fails (S38: NO), in S39, the second CGI 204*b* again causes the display 128 of the PC 120 to display the input screen of an ID and a PW, thereby prompting the user to input an ID and a PW (password verification processing). Then, the second CGI 204*b* returns to S37.

When the verification is successful (S38: YES), the second CGI 204*b* proceeds to S27, and transmits the web screen data generated by the second CGI 204*b* to the display 128 of the PC 120 (unlimited transmission processing). Also in this case, the web screen that is displayed as the remote panel includes the same display area 19*a* that is the same as display contents on the display of the LCD module 19 at that time, and the ten-key display area 19*b*, as shown in FIG. 5C. When the second CGI 204*b* proceeds from S38 to S27 in this way, in S27, the USB flag is on, i.e., indicates that the communication partner of the remote panel is connected to the USB.

In the state where the remote panel is displayed in S27, the user can input an instruction to the multifunction peripheral 10 by a mouse click or touch operation on the display 128 or 144. The display contents of the remote panel on the display 128 or 144 are updated (refreshed) to the latest information at intervals designated by the user.

In this way, in the present illustrative embodiment, for the remote panel transmission request from the PC 120 or mobile terminal 140 connected to the LAN, the web server 204 transmits the web screen data relating to the remote panel to the PC 120 or the mobile terminal 140 after the LCD module 19 that is a reception unit receives the approval input via the notification processing and the confirmation processing. On the other hand, for the remote panel transmission request from the PC 120 connected to the USB, the web server 204 transmits the web screen data relating to the remote panel without executing the notification processing and the confirmation processing. Therefore, while ensuring the sufficient security for the PC 120 or mobile terminal 140 connected to the LAN, a user's operation burden can be reduced for the PC 120 connected to the USB, which is favorable in terms of usability.

Since the web server 204 executes the encryption determination processing for the remote panel transmission request from the PC 120 or mobile terminal 140 connected to the LAN, it is possible to ensure confidentiality of communication. Therefore, even when the terminal device is connected to the LAN, it is possible to prevent the information displayed on the web screen from being leaked.

Also, in the present illustrative embodiment, when the remote panel transmission request from the PC 120 or mobile terminal 140 connected to the LAN is not encrypted, the web server 204 requests the redirect to the address corresponding to encryption. Therefore, even when the original transmission request is not encrypted, it is possible to display the web screen while preventing the information leakage, without imposing a troublesome operation on the user.

Also, for the remote panel transmission request from the PC 120 connected to the USB, the web server 204 transmits the web screen data relating to the remote panel without executing the encryption determination processing, the notification processing and the confirmation processing. Therefore, it is possible to prevent processing that is less necessary from being executed in USB connection with little risk of the information leakage.

Also, in the present illustrative embodiment, as described in the processing of S13 and S14 and S31 and S32, the web server 204 transmits the web screen data by giving priority to the USB connection having higher security than the LAN connection. By doing so, even if the multifunction peripheral 10 is taken over by an attacker who operates the terminal device connected to the LAN, it is possible to regain control of the multifunction peripheral 10 by operating the PC 120 connected to the USB. Also, after the multifunction peripheral 10 transmits the web screen data to the PC 120 connected to the USB by the unlimited transmission processing, the multifunction peripheral 10 is not taken over by an attacker who operates the terminal device connected to the LAN.

Also, in the present illustrative embodiment, when a rejection input is made on the approval screen, the multifunction peripheral 10 enters the approval lock state, and thereafter, until the approval lock is released, the multifunction peripheral 10 does not display the approval screen even when it receives the transmission request of the remote panel from the terminal device connected to the LAN. For this reason, it is possible to prevent a situation in which the multifunction peripheral 10 cannot be substantially used when the transmission request from the terminal device connected to the LAN, which should not be approved, is repeated multiple times in a short time.

In addition, in the present illustrative embodiment, when the number of consecutive failure times of the PW verification reaches the predetermined threshold value, the multifunction peripheral 10 enters the PW lock state, and thereafter, until the PW lock is released, the multifunction peripheral 10 does not display the PW input request screen even when it receives the transmission request of the remote panel from the terminal device connected to the LAN. For this reason, it is possible to prevent a situation in which the multifunction peripheral 10 cannot be substantially used when the transmission request from the terminal device connected to the LAN and operated by the user who does not know the password is repeated multiple times in a short time.

Also, the web server includes the first CGI 204a and the second CGI 204b corresponding to the URLs different from each other, so that it is possible to execute the processing corresponding to the request from the PC 120 or the mobile terminal 140.

Modification to Illustrative Embodiments

Subsequently, a variety of modified illustrative embodiments of the above-described illustrative embodiment are described.

In the above-described illustrative embodiment, the web server 204 includes the first CGI 204a and the second CGI 204b. However, the present disclosure includes a configuration where the processing unit with no CGI can execute each of the above-described processing.

The image forming apparatus may not be provided with a device such as an LCD for displaying an image and a character as a still image or a moving picture. For example, one or more lamps such as LEDs may be provided, and the notification for prompting an approval input by a blinking pattern thereof may be issued. Also, in addition to or instead of the display device, the notification may be issued by a voice from an acoustic device such as a speaker.

The processing of S16 and S17 may be executed only for a terminal device for which the approval input has never been made, and may be omitted for a terminal device that has transmitted the transmission request of the remote panel for which the approval input has been previously made. Specifically, identification information of the terminal device is included in the transmission request of the remote panel, and the multifunction peripheral stores the identification information when the approval input is made. Before executing the processing of S16, the identification information of the terminal device included in the transmission request of the remote panel is verified with the stored identification information. When the verification is successful, the processing of S16 and S17 is omitted, and when the verification fails, the processing of S16 and S17 is executed.

The approval lock may be released when a predetermined time period elapses after the shift to the approval lock state. Alternatively, the approval lock may be released when any one of conditions that a predetermined time period elapses after the shift to the approval lock state and that the processing unit receives a new transmission request in the approval lock state and the transmission request is determined as being transmitted via the non-network driver is earlier satisfied.

The PW lock may be released when a predetermined time period elapses after the shift to the PW lock state. Alternatively, the PW lock may be released when any one of conditions that a predetermined time period elapses after the shift to the PW lock state and that the processing unit receives a new transmission request in the PW lock state and the transmission request is determined as being transmitted via the non-network driver is earlier satisfied.

The determination in S11 may be omitted.

When a result of the determination in S11 is NO, the redirect may not be requested.

The USB flag may not be provided, and the processing of S13 and S31 may be omitted.

In the case of the USB connection, the encryption determination processing may be executed.

The processing (S15, S18, S33 and S34) relating to the approval lock and/or the processing (S19, S22, S23, S25, S26, S35 and S36) relating to the PW lock may be omitted.

In the USB connection, the PW lock processing may be executed.

The processing of S20 to S26 may be executed earlier than the processing of S16, and the success in the PW verification may be set as a condition for displaying the approval screen (S16).

The non-network driver may be a driver other than the USB driver.

The determination as to whether the connection request is transmitted via the network driver or the non-network driver may not be performed based on the flag, like the above-described illustrative embodiment, but may be performed based on other means.

The encryption protocol may be TLS (abbreviation of Transport Layer Security), for example, other than SSL.

The connection method of the wireless LAN may be a Peer to Peer method such as Wi-Fi Direct, in addition to Wi-Fi.

Also, in the above-described illustrative embodiment, the inkjet-type image forming apparatus configured to record an image by ink discharged from the nozzles has been exemplified. However, the present disclosure can also be applied to an image forming apparatus having a recording unit of a recording type such as a laser type, other than the inkjet type.

What is claimed is:

1. An image forming apparatus comprising:
a recording device configured to form an image on a recording medium;
a user interface configured to receive a user input;
a notification device; and
a controller,
wherein the controller comprises:
a network driver performing communication with a terminal device via a network;
a non-network driver performing communication with a terminal device connected to the image forming apparatus in a wired manner, without via the network; and
a processor configuring a web server, the web server being configured to generate web screen data relating to formation of an image in the recording device, the processor being configured to receive a transmission request of the web screen data of an HTTP format from the terminal device via the network driver or the non-network driver, and
wherein the processor is configured to perform:
(a) determining whether the transmission request is transmitted via the network driver or the non-network driver;
(b) in a case it is determined that the transmission request is transmitted via the network driver,
(b1) controlling the notification device to issue a notification;
(b2) after the controlling of the notification device, confirming whether the user interface receives an approval input indicating that the transmission request is approved; and
(b3) after it is confirmed that the user interface receives the approval input, limitedly transmitting the web screen data to the terminal device; and
(c) in a case it is determined that the transmission request is transmitted via the non-network driver,
unlimitedly transmitting the web screen data to the terminal device, without performing the controlling of the notification device and without confirming whether the user interface receives the approval input indicating that the transmission request is approved.

2. The image forming apparatus according to claim 1, wherein the processor is configured to perform:
(b) in the case it is determined that the transmission request is transmitted via the network driver,
(b0) determining whether the transmission request is encrypted, before the controlling of the notification device;
in a case it is determined that the transmission request is encrypted, perform the controlling of the notification device, the confirming and the limitedly transmitting; and
in a case it is determined that the transmission request is not encrypted, not to perform the controlling of the notification device.

3. The image forming apparatus according to claim 2, wherein in the case it is determined that the transmission request is not encrypted, the processor is further configured to perform instructing the terminal device to transmit the transmission request to an address corresponding to encrypted communication.

4. The image forming apparatus according to claim 2, wherein the processor is configured to:
(c) in the case it is determined that the transmission request is transmitted via the non-network driver,
perform the unlimitedly transmitting, without performing the determining of the encryption, the controlling of the notification device and the confirming.

5. The image forming apparatus according to claim 1, wherein the processor is further configured to:
in a case where a transmission request is received from another terminal device after transmitting the web screen data to the terminal device by the limitedly transmitting, in a case it is determined that the transmission request is transmitted via the non-network driver, thereafter perform the unlimitedly transmitting of transmitting the web screen data to another terminal device, without performing the limitedly transmitting; and in a case where a transmission request is received from another terminal device after transmitting the web screen data to the terminal device by the unlimitedly transmitting, in a case it is determined that the transmission request is transmitted via the network driver, perform the unlimitedly transmitting even thereafter and further perform rejecting the controlling of the notification device in accordance with the transmission request.

6. The image forming apparatus according to claim 1, wherein the processor is further configured to perform:
wherein in the confirming, confirming whether the user interface receives any one of the approval input and a rejection input of rejecting the transmission request, after the controlling of the notification device, and
wherein in a case it is confirmed that the user interface receives the rejection input,
shifting to an approval lock state;
in a case the processor receives a new transmission request in the approval lock state and it is determined that the transmission request is transmitted via the network driver, rejecting the controlling of the notification device; and
in a case at least one of: a first predetermined time period elapses after the shift to the approval lock state; and the processor receives a new transmission request in the approval lock state and it is determined that the transmission request is transmitted via the non-network driver, releasing the approval lock state.

7. The image forming apparatus according to claim 1, wherein the processor is further configured to perform:
password verification comprising:
requesting the terminal device having transmitted the transmission request to input a password;
verifying a password transmitted from the terminal device; and
again requesting the terminal device to input a password if the verification fails;
in a case a number of consecutive failure times of the verification in the password verification reaches a predetermined threshold value with respect to the transmission request for which it is determined that the transmission request is transmitted via the network driver, shifting to a password lock state;
in a case the processor receives a new transmission request in the password lock state and it is determined that the transmission request is transmitted via the network driver, rejecting the password verification; and
in a case at least one of: a second predetermined time period elapses after the shift to the password lock state; and the processor receives a new transmission request in the password lock state and it is determined that the transmission request is transmitted via the non-network driver, releasing the password lock state, and
wherein the web screen data is transmitted to the terminal device in the limitedly transmitting or the unlimitedly transmitting on condition that the password verification for the terminal device is successful.

* * * * *